United States Patent [19]

Joe et al.

[11] Patent Number: 5,127,700
[45] Date of Patent: Jul. 7, 1992

[54] REAR VIEW MIRROR AND SUN VISOR ASSEMBLY FOR A VEHICLE

[76] Inventors: Tobby F. Joe; Betty C. Joe, both of 2578 Daytona Ave., Hacienda Heights, Calif. 91745

[21] Appl. No.: 610,398

[22] Filed: Nov. 7, 1990

Related U.S. Application Data

[63] Continuation-in-part of Ser. No. 370,600, Jun. 23, 1989, abandoned.

[51] Int. Cl.⁵ .................................... B60J 3/00
[52] U.S. Cl. ........................... 296/97.5; 296/97.6; 296/97.9
[58] Field of Search ............. 296/97.2, 97.5, 97.6, 296/97.7, 97.9, 97.12, 97.13; 350/606, 629, 632, 636; 248/481, 482

[56] References Cited

U.S. PATENT DOCUMENTS

| | | | |
|---|---|---|---|
| 564,454 | 7/1896 | Ryan | 350/632 X |
| 1,518,956 | 12/1924 | Beitman | 296/97.5 X |
| 1,909,302 | 5/1933 | Moorby | 296/97.5 X |
| 1,958,934 | 5/1934 | Williams | 296/97.6 X |
| 2,458,125 | 1/1949 | Winkler | 296/97.2 |
| 2,528,038 | 10/1950 | Crise | 296/97.6 X |
| 3,316,052 | 4/1967 | Ross | 350/632 |
| 3,367,616 | 2/1968 | Bausch et al. | 350/632 X |
| 3,722,949 | 3/1973 | Palman | 296/97.6 |
| 3,788,735 | 5/1972 | Rowley . | |
| 3,954,297 | 5/1976 | Linke et al. | 296/97.6 |
| 4,023,854 | 5/1977 | Nack, Jr. | 296/97.6 |
| 4,068,930 | 12/1976 | Marcus . | |
| 4,248,474 | 2/1981 | Mandrick | 296/97.6 |
| 4,264,144 | 4/1981 | McCord | 350/629 |
| 4,275,916 | 4/1979 | Skogler . | |
| 4,280,730 | 7/1981 | Turner | 296/97.6 |
| 4,352,519 | 10/1982 | Aro | 296/97.6 |
| 4,378,129 | 1/1981 | Kaiser . | |
| 4,421,355 | 7/1981 | Marcus . | |
| 4,486,075 | 9/1982 | Cohen . | |
| 4,614,412 | 9/1986 | Cohen | 350/636 X |
| 4,703,972 | 11/1987 | Omberg | 296/97.12 |
| 4,711,483 | 1/1986 | Gulette . | |
| 4,824,161 | 4/1989 | Lee | 296/97.12 X |
| 4,830,424 | 11/1987 | Svensson . | |
| 4,834,521 | 5/1989 | Dubs | 350/606 X |
| 4,895,435 | 1/1990 | Shomper | 296/97.5 X |
| 4,921,340 | 5/1990 | Dyer | 350/606 X |

FOREIGN PATENT DOCUMENTS

| | | |
|---|---|---|
| 841105 | 6/1952 | Fed. Rep. of Germany . |
| 2210678 | 9/1973 | Fed. Rep. of Germany ..... 296/97.6 |
| 670693 | 12/1929 | France . |
| 2115047 | 7/1972 | France . |
| 577519 | 6/1958 | Italy . |

*Primary Examiner*—Johnny D. Cherry
*Assistant Examiner*—Joseph D. Pape
*Attorney, Agent, or Firm*—Denton L. Anderson

[57] ABSTRACT

A rear view mirror and sun visor assembly for an automotive vehicle is provided which includes an elongated rectangular convex rear view mirror encased in a housing which is mounted to the vehicle in front of the driver's seat. A sun visor flap is hinged at its upper edge with a friction hinge to the lower mirror housing and may be rotated into an extended position to block sun glare or into a horizontal, hidden position behind the housing for storage when not in use. The mirror has spherical curvature with a long radius of curvature and has a horizontal dimension of some two feet, all of which factors produce distortion-free full-view rear vision much superior to the partial rear view with conventional mirrors, as well as an extension of the downward field of view. In addition to the direct swivel mount, two additional mounting arrangements, with successively greater degrees of freedom, permit the mirror to be placed in the optimum position for a particular driver's eyes, for best results. Additional sun visor flaps can be successively friction-hinged to the assembly for a downward extension of sun glare blockage when the sun is low in the sky during driving. The number of additional sun visor flaps can be increased to cover the whole front windshield as a sun shield when the vehicle is parked.

2 Claims, 7 Drawing Sheets

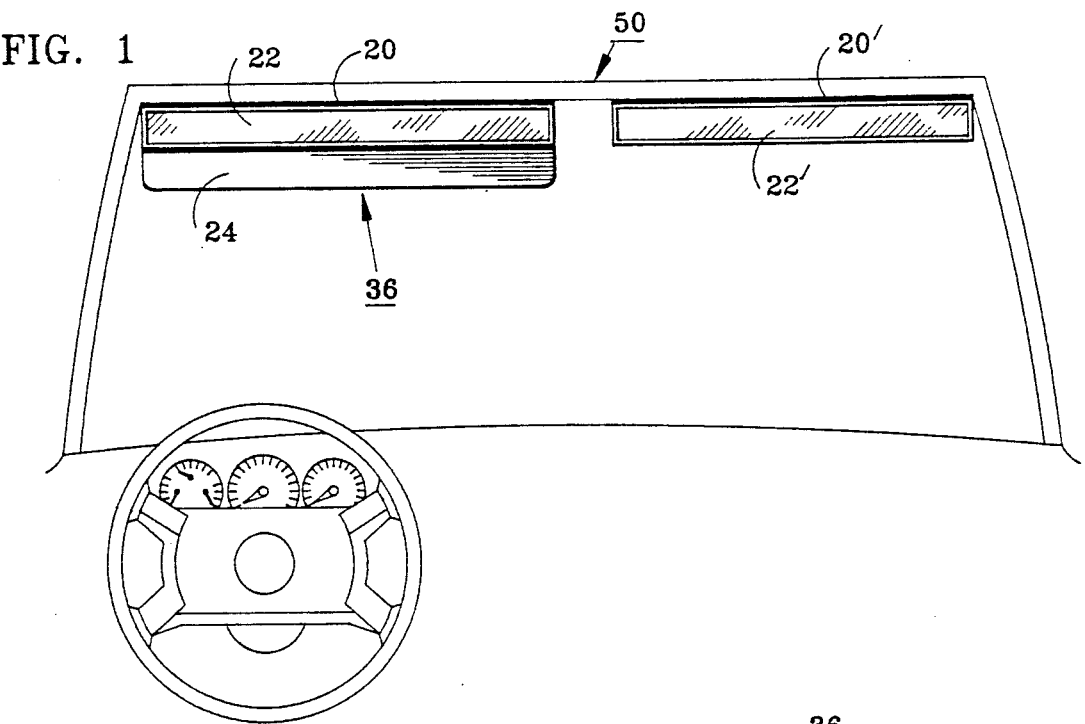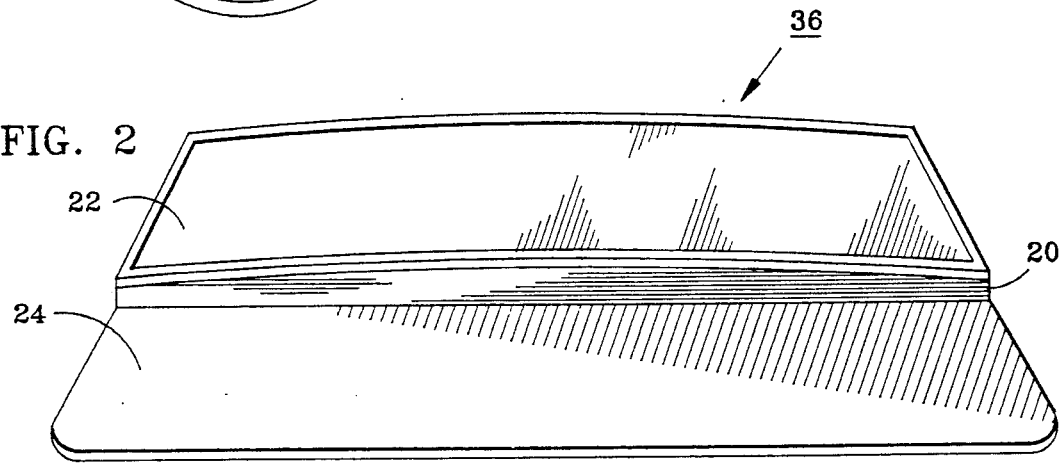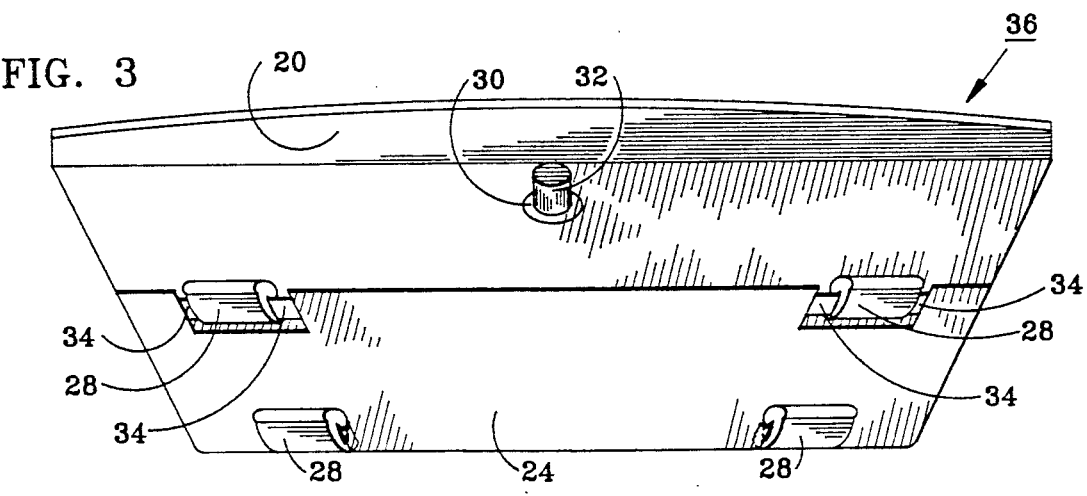

REAR VIEW MIRROR AND SUN VISOR ASSEMBLY FOR A VEHICLE

BACKGROUND OF THE INVENTION

Related Application

This application is a continuation-in-part of U.S. Pat. application Ser. No. 07/370,600, filed Jun. 23, 1989 now abandoned.

Field Of The Invention

This invention relates to a rear view mirror and sun visor assembly for an automobile vehicle. More specifically, it relates to a convex, full-view rear view mirror and sun visor assembly.

Description Of Related Art

A rear view mirror and sun visor are important components in an automotive vehicle. The rear view mirror allows the driver to see objects behind him, and the sun visor helps block off sun glare.

The conventional rear view mirror in a vehicle is a rectangular flat mirror installed at the upper center of the front windshield. In an attempt to increase the driver's area of vision to the right rear and to the left rear, side mirrors are frequently installed on the passenger side front door and on the driver's side front door of the vehicle. However, the use of three separate mirrors require the driver to look in three separate directions. Also, in any many cases there are still blind spots left on both sides of the vehicle. As a consequence, a driver operating a vehicle equipped with conventional rear view and side view mirrors is still required to physically turn his head in the direction of those blind spots whenever he makes a lane change or a turn. This is obviously hazardous and can lead to accidents.

In an attempt to improve upon conventional flat rear view mirrors, it has been suggested to use convex rear view mirrors. For example, U.S. Pat. No. 4,895,435 discloses the use of a rectangular convex mirror attached to the driver's side sun visor. Also, U.S. Pat. No. 4,486,075 discloses a mirror unit having a convex mirror on one side and a flat mirror on the opposing side mounted at the upper center of the front windshield. However, the prior use of convex mirrors has not been without problems either.

Unless a convex mirror has a long radius of curvature, it cannot provide a vehicle driver with a full panoramic view to the rear and sides. Until now, however, it was not known how to use convex, long radius of curvature mirrors in a vehicle because the length of such mirrors interferences with the usual sun visor assemblies used in the vehicle.

Also, because of their curvatures, convex mirrors, must be precisely adjusted to the driver's eyes in the left/right and up/down directions to minimize distortion. Because human beings and vehicle interiors differ considerably with respect to their size characteristics, it has not previously been known how to use convex mirrors in vehicles without incurring such distortions.

Accordingly, there remains a need for a rear view mirror which minimizes or wholly eliminates blind spots in the rearward vision. There further remains a need for a convex rear view mirror which can be used by drivers of various sizes in vehicles of various interior dimensions without encountering curvature distortions.

SUMMARY OF THE INVENTION

The invention satisfies these needs. The invention comprises a combination rear view mirror and sun visor assembly useful in an automotive or other vehicle. The invention includes a mounting base for securing the assembly to the vehicle interior, preferably near the line of intersection of the vehicle roof and the front windshield. The invention also includes a rear view mirror attachment having a first end and a second end which is attached to the mounting base at its first end. An elongated rear view mirror housing is attached to the second end of the attachment means. An elongated convex rear view mirror with a circular curvature and a long radius of curvature (greater than about 8 feet) is encased in the rear view mirror housing. An adjustable hinge connection means is attached to the bottom side of the housing. A sun visor flap is attached to the hinge means in such a way that the flap can be rotated about the hinge means to a plurality of positions within a 90° arc extending from an essentially horizontal position to an essentially vertical (fully downward extended) position. The adjustable hinge connection means is adapted to keep the flap stationery in each of the several flap positions.

The elongated rectangular convex rear view mirror of spherical curvature has a long radius of curvature to provide full-view distortion-free rear vision with an extended field of view in the downward direction. This mirror is encased in a mirror housing and mounted on the vehicle in front of the driver's seat facing the driver. For optimum rearward vision the driver's eyes should be close to the bisector of the central angle of the mirror arc. Due to variation in human dimensions such as leg length and torso height, and variation of vehicle dimensions such as front windshield height and width, front seat location and other factors, mirror mountings with different degrees of freedom are provided so that the driver's eyes may view the mirror at the appropriate angle. These mountings connect the mirror housing to a location near the linear intersection of the vehicle roof and front windshield and are in ascending number of degrees of freedom: the direct swivel attachment, the mounting with one double-ball-joint tubular connector, and the mounting with two double-ball-joint tubular connectors in series. All ball joints are of the friction type and the mirror will stay put at any mounting configuration. The full-view feature of this rear view mirror makes it unnecessary for the driver to turn his head for turns or lane changes because he can see objects to the side of the vehicle through the convex mirror of this invention. Door-mounted side mirrors are not needed with this invention.

The sun visor flap can rotate through a 90° arc extending from an essentially horizontal stored position vehicle the mirror mounting where it is not visible to the driver, to an essentially vertical fully extended position more or less co-planar with the mirror for maximum sun glare blocking. The embodiment of a friction hinge in this invention can take the form of insertion brackets installed on the lower part of the back of the rear view mirror housing engaging with matching insertion slots installed on the upper edge of the sun visor flap.

Optionally, for additional sun visor capability when the sun is low in the sky, a sun visor assembly made up of a small number of additional sun visor flaps hinged together in series by the same friction hinge method described above is hinged to the lower edge of the sun visor flap hinged to the mirror housing. The driver may then extend one or more additional sun visor flaps as necessary, for greater sun glare blocking. When not needed, the sun visor assembly flaps are folded up and rotated into the storage position as for the single sun visor flap.

Also, for completely blocking the sun from the vehicle front windshield when the vehicle is parked, a sun shield assembly made up of a series of sun visor flaps similar to the sun visor assembly described above, is hinged from the mirror housing or from the sun visor flap hinged to the mirror housing using the same friction hinge method. In this case the total extended length of the flaps in the sun shield assembly is determined by the distance from vehicle roof to dashboard along the front windshield.

BRIEF DESCRIPTION OF THE DRAWINGS

A better understanding of the invention may be gained by reference to the following detailed description in conjunction with the accompanying drawings, in which:

FIG. 1 is an elevational view of the vehicle front windshield equipped with a rear view mirror and sun visor assembly having features of the invention, as seen from the front seat of the vehicle looking forward;

FIG. 2 is a pictorial view of a second rear view mirror and sun visor assembly looking at the mirror face up;

FIG. 3 is a pictorial view of the assembly of FIG. 2 having features of the invention looking at the back of the mirror;

FIG. 5 is a view of the assembly of FIG. 2 looking from the top at the mirror edge on;

FIG. 8 is a view of the assembly sun visor flap of FIG. 2 looking at it edge on;

DESCRIPTION

Figure 4:
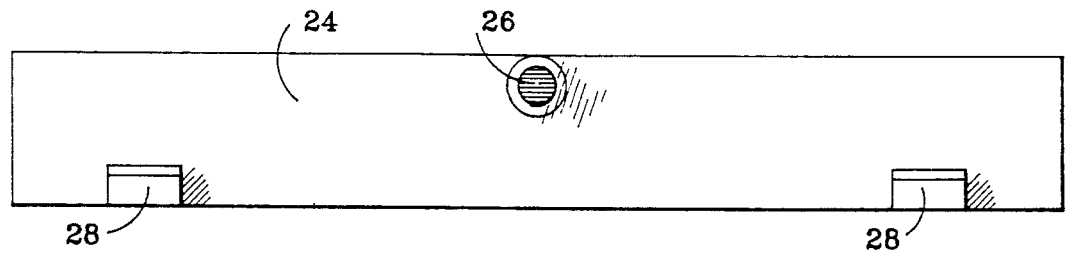
FIG. 4 is a view of the assembly of FIG. 2 looking at the back of the mirror.

Referring to FIG. 1, the front windshield 44 of a vehicle 50 is shown equipped with a rear view mirror and sun visor assembly 36 having features of this invention. Assembly 36 consists of an elongated rectangular convex rear view mirror 22 encased in a similarly dimensioned housing 20, the lower long edge of which is hingedly attached to a wide rectangular sun visor flap 24.

Housing 20 is mounted to vehicle 50 with its upper edge parallel to and near the line of intersection of vehicle roof 48 and front windshield 44, generally in front of and central with the driver's seat. Also shown is an elongated rectangular flat mirror 22' which is usable as a vanity mirror. Mirror 22' is encased in a similarly dimensioned housing 20' which is mounted to vehicle 50 with its upper edge parallel to and near the line of intersection of vehicle roof 48 and front windshield 44, generally in front of and central with the front passenger's seat. Hingedly attached to the lower long edge of housing 20' is another elongated rectangular sun visor flap 24'. FIG. 1 shows flap 24 on the driver's side as rotated into a position where it intercepts the sun's glare, while flap 24' on the passenger side is shown rotated behind mirror 20' so that flap 24' is not visible from the vehicle front seat.

Referring to FIGS. 2 and 3, a typical cross-section of convex mirror housing 20 may be seen, thicker in the middle than at the ends to match the large radius of curvature of convex mirror 22. The method of hingedly attaching flap 24 to housing 20 consists of attaching insertion brackets 28 to housing 20 and cutting matching insertion slots 34 in flap 24 for receiving brackets 28. FIG. 3 shows insertion brackets 28 also at the lower edge of flap 24 to permit additional downward extending sun visor flaps 24 to be hingedly attached.

Figure 5:
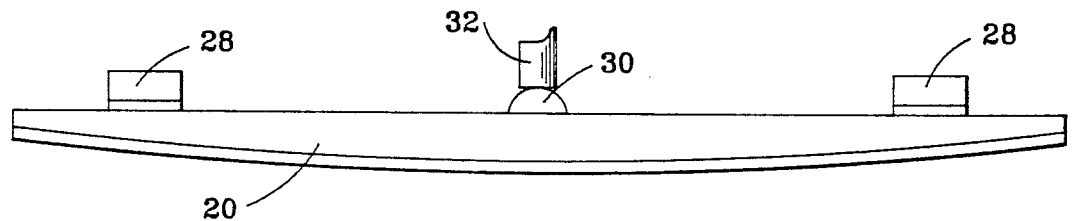
Figure 6:
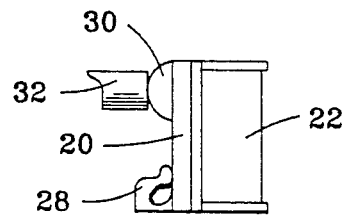
FIG. 6 is a side view of the assembly mirror of FIG. 2.

Referring to FIGS. 4, 5 and 6, insertion brackets 28 are shown attached to the lower bottom edge of the back of housing 20 and defining U-shaped clips with insertion openings facing rearwardly toward the back of housing 20. Also shown are details of a direct swivel attachment 26 with a ball joint 30 and a connecting rod 32, located at the upper central portion of the back of housing 20.

Figure 7:
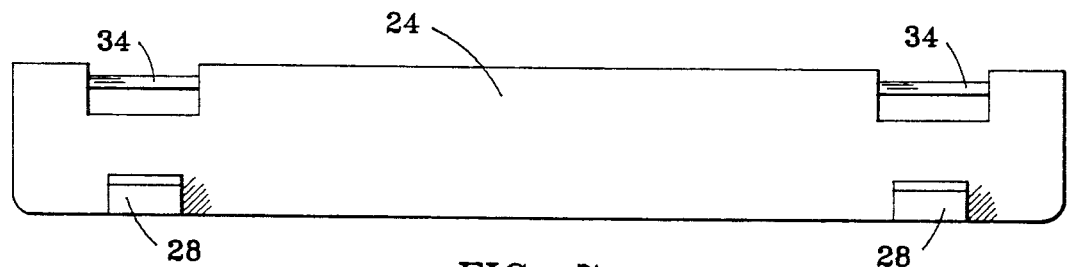
FIG. 7 is a view of the assembly sun visor flap of FIG. 2 looking at the face of the flap.
Figure 8:
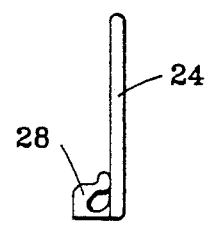
Figure 9:
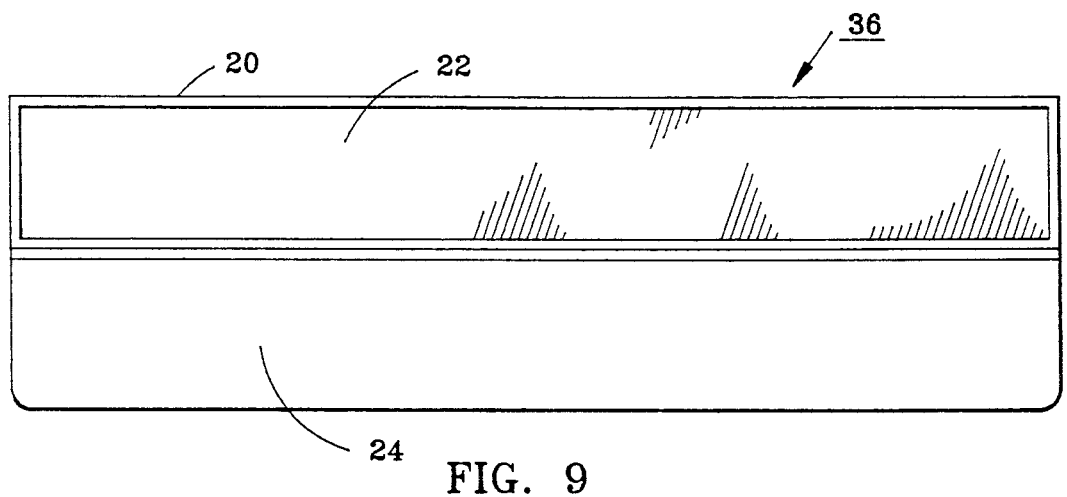
FIG. 9 is an elevation of the rear view mirror and sun visor assembly of FIG. 2 showing the face of the mirror and the sun visor in the extended position forming an extension of the mirror essentially co-planar with the mirror.
Figure 10:
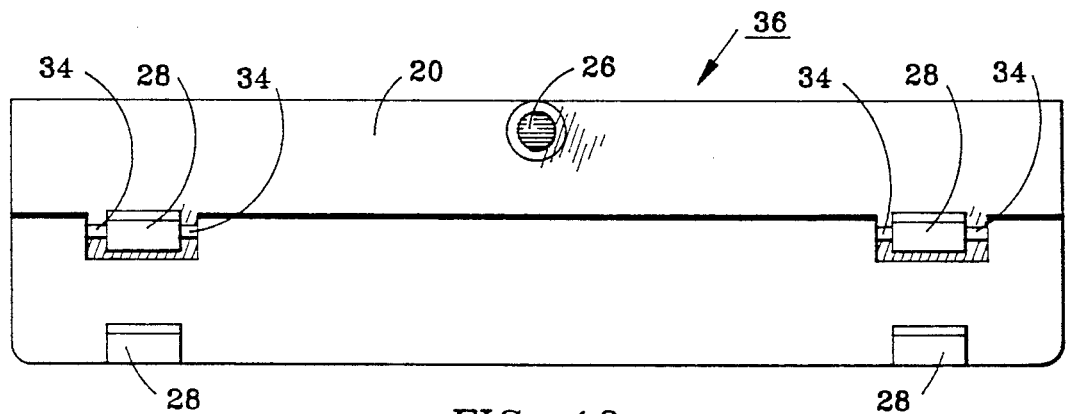
FIG. 10 is an elevation of the rear view mirror and sun visor assembly of FIG. 2 looking at the back of the mirror with the sun visor in the extended position forming an extension of the mirror essentially co-planar with the mirror.
Figure 11:
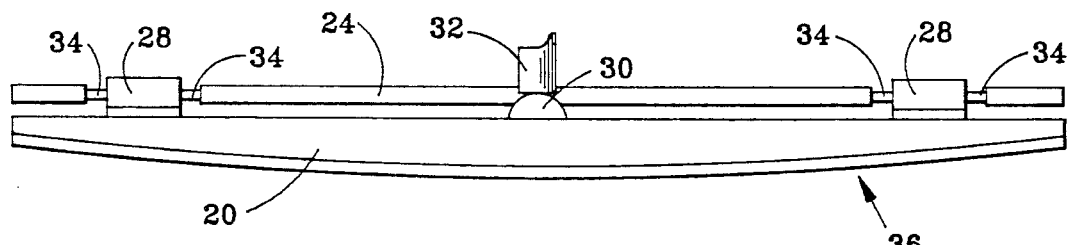
FIG. 11 is a top edge-on view of the rear view mirror and sun visor assembly with the sun visor assembly of FIG. 2 in the extended position forming an extension of the mirror essentially co-planar with the mirror.

Referring to FIGS. 7 and 8, insertion slots 34 are shown cut into the upper long edge of flap 24, and insertion brackets 28 are shown attached to the lower long edge of flap 24. The slots 34 match the brackets 28 in the housing 20 and at the lower edge of additional flaps 24.

Figure 12:
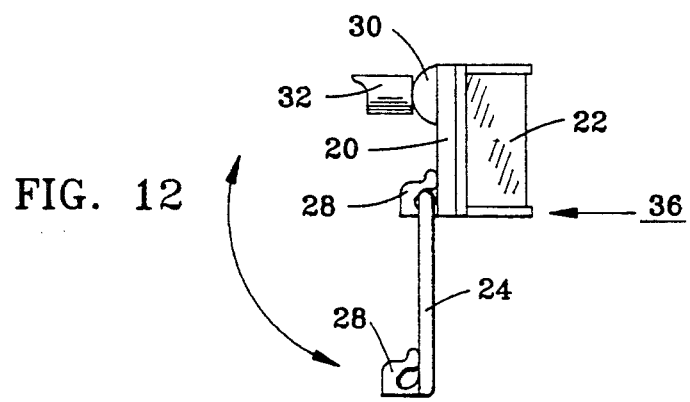
FIG. 12 is a side view of the rear view mirror and sun visor assembly of FIG. 2 with the sun visor in the extended position forming an extension of the mirror essentially co-planar with the mirror.

Referring to FIGS. 9, 10, 11 and 12, the assembly 36 is shown with brackets 28 in housing 20 engaged hingedly with slots 34 in flap 24. In particular, flap 24 is shown rotated to its fully extended position where it forms an extension of mirror 20, essentially co-planar with the mirror, with its lower edge in the lowest possible position. FIG. 12 shows how flap 24 can rotate through a 90° arc, from its fully extended position to its zero-extension stored or hidden position behind mirror 22. The engagement of brackets 28 with slots 34 is a friction fit, so that flap 24 will stay put in any position to which it is rotated.

Figure 13:
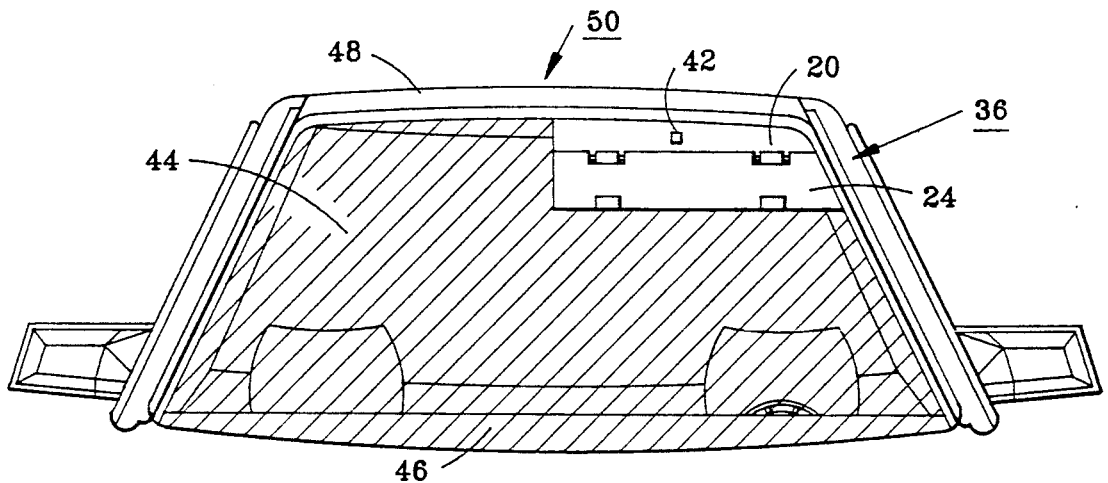
FIG. 13 is a back view of a rear view mirror and sun visor assembly having features of the invention shown installed on the front windshield of a vehicle, looking toward the rear of the vehicle.

Referring to FIG. 13, assembly 36 is shown secured to a mounting base 42 on vehicle 50 via direct swivel attachment 26 (hidden in this view behind mounting base 42) on housing 20. The components of vehicle 50 shown in this view are a roof 48, front windshield 44, and dashboard 46.

Figure 14:
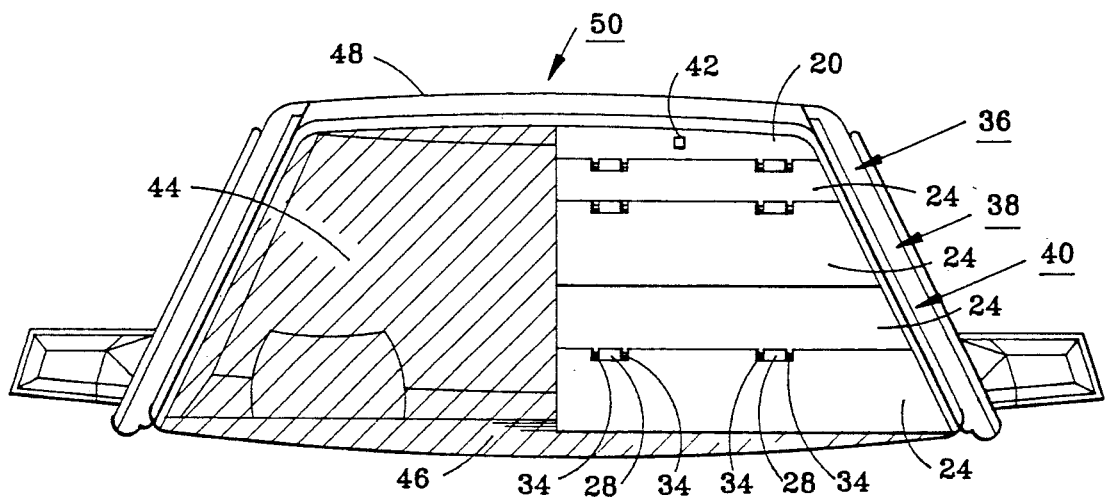
FIG. 14 is a back view of the combined rear view mirror and sun visor assembly and sun shield assembly of FIG. 13 looking toward the rear of the vehicle.
Figure 15:
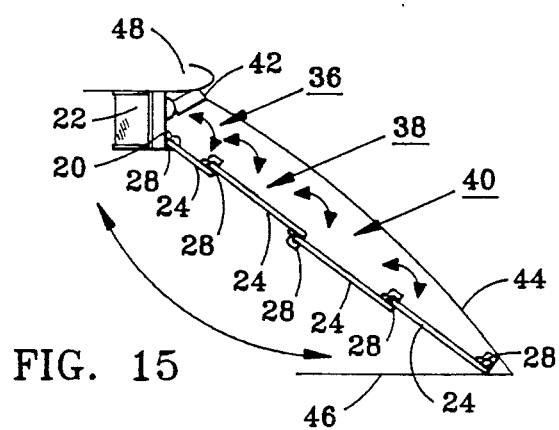
FIG. 15 is a side view of the combined rear view mirror and sun visor assembly of FIG. 13 and sun shield assembly.

Referring to FIGS. 14 and 15, there is shown rear view mirror and sun visor assembly 36 in combination with a sun visor assembly 38 and with a hinged sun shield assembly 40. Both sun visor assembly 38 and sun shield assembly 40 involve a series of additional sun visor flaps 24 which are hingedly attached to each other and to the flap 24.

Sun visor assembly 38 is directed to augment the visor area in the downward direction, for example when the sun is low in the sky, while driving. For this purpose sun visor assembly 38 is formed by connecting a small number of flaps 24 in series by engaging the insertion brackets 28 on one flap 24 with the insertion slots 34 in the neighboring flap 24 and so on to the last flap 24. The slots 34 on the upper edge of topmost flap 24 of assembly 38 are the connected to the brackets 28 on the lower edge of the flap 24 which is attached to housing 20 of mirror 22. Thus a succession of sun visor flaps 24, hingedly and with friction fit attached to each other, are at the driver's disposal. The driver may rotate each individual flap 24 into partial or full extension, as needed, or fold all flaps 24 up for storage behind mirror 22 and housing 20 when none are needed.

Sun shield assembly 40 is used to block the sun completely from windshield 44 when the vehicle is parked to reduce the vehicle interior temperature. Sun shield assembly 40, like assembly 38, consists of a series of hingedly attached flaps 24, with the topmost flap 24 attached to housing 20. Now the length of, or the number of flaps 24 in, sun shield assembly 40 is determined by the distance between roof 48 and dashboard 46 along front windshield 44 of vehicle 50, with the lower edge of the bottom-most flap 24 located near the line of intersection of dashboard 46 with front windshield 44, as shown in FIG. 15. This Figure also shows the attachment of mirror 22 and housing 20 via direct swivel attachment 26 to mounting base 42.

Figure 16:
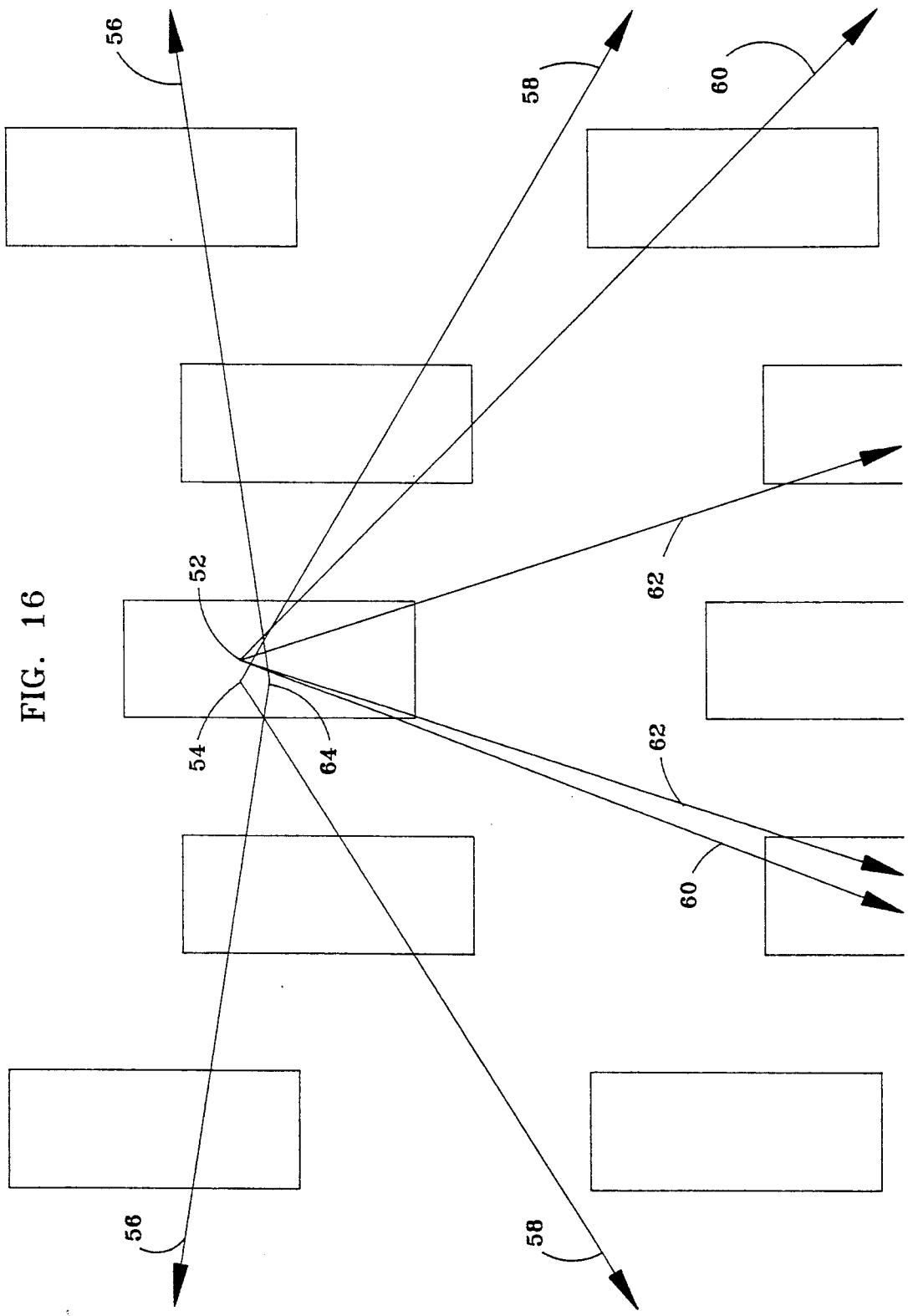
FIG. 16 is a top view of a vehicle (and other vehicles in a multi-lane traffic situation) in which the rearward viewing coverages of an assembly having features of the present invention, a conventional flat rear view mirror and a typical convex rear view mirror are compared.

Referring to FIG. 16, a plan view of vehicle 50 proceeding in the direction of motion indicated by the arrow, together with other vehicles in a multi-lane traffic situation, is shown. A comparison is made among the rearward view coverage of the present invention and more conventional rear view mirrors from the view of a driver position 64. The mirror 22 of the present invention has a mounted position 54 and a rearward viewing area between lines 58, with a rear viewing angle 58-54-58. A typical convex mirror has a mounted position 52 and a rearward viewing area between lines 60, with a rear viewing angle 60-52-60. A conventional flat rear view mirror has a mounted position 52 and a rearward viewing area between lines 62, with a rear viewing angle 62-52-62. The driver at position 64 has a direct forward viewing area between lines 56, with a forward viewing angle 56-64-56. It is observed that the present invention permits a practically complete peripheral driver's view. For example, the rears of vehicles 38 and 66 in lanes adjacent to driver's vehicle 50 are only visible with the present invention. Typically, the rearward viewing area of the convex mirror of this invention is five times that of the conventional flat rear view mirror, two-and-a-half times that of a typical convex mirror, or one-and-a-half times the combined rear view area of the conventional flat rear view mirror in combination with both conventional door-mounted side view mirrors.

Figure 17:
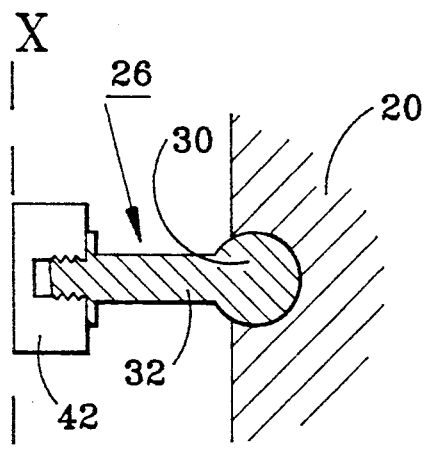
FIG. 17 is a view of a typical direct swivel attachment used in a rear view mirror assembly.
Figure 18:
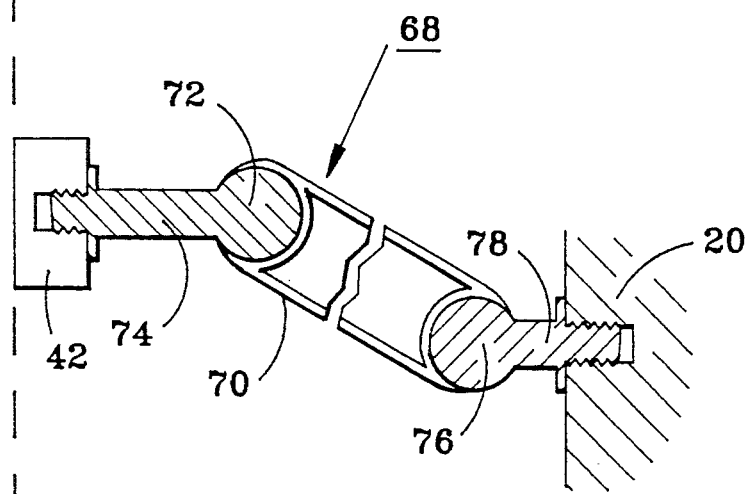
FIG. 18 is a view of an attachment device useful in an assembly having features of the invention.
Figure 19:
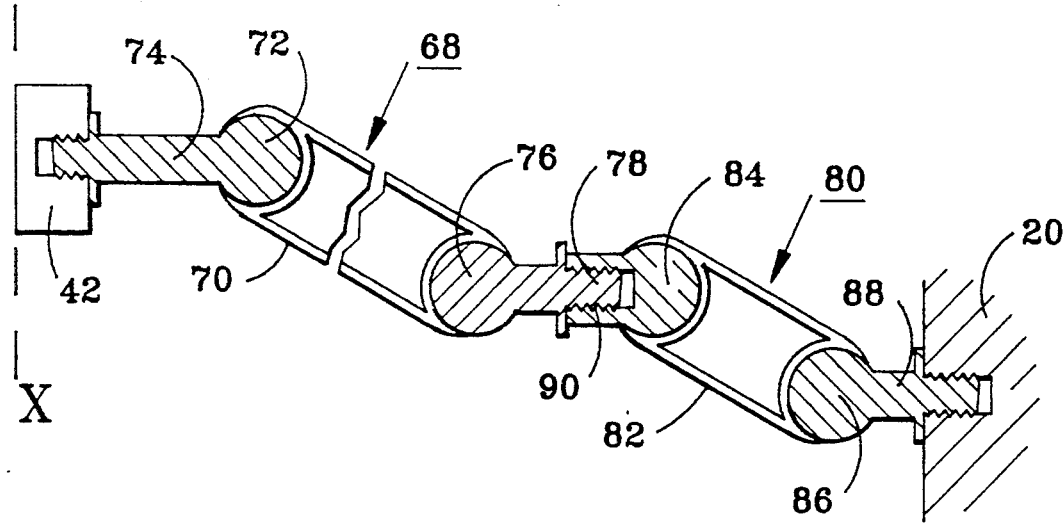
FIG. 19 is a view of a second attachment device useful in an assembly having features of the invention.

Referring to FIGS. 17, 18 and 19, three embodiments are shown for attachment of housing 20 which encases rear view mirror 22 of this invention to mounting base 42 on vehicle 50.

FIG. 17 shows direct swivel attachment 26 made up of ball joint 30 integral with connecting rod 32 terminating in a male extension which is received in mounting base 42.

An additional degree of freedom in the attachment is shown in FIG. 18 where a first double-ball-joint tubular connector 68 is used, made up of a ball joint 76 integral with male extension 78 which is received in housing 20, connected by first tube 70 to ball joint 72 integral with male extension 74 which is received in mounting base 42.

Two additional degrees of freedom in the attachment can be achieved as shown in FIG. 19, where a second double-ball-joint tubular connector 80 is connected between the first double-ball joint tubular connector 68 and housing 20. Second tubular connector 80 has a ball joint 84 integral with female extension 90 which receives male extension 78 of first tubular connector 68. Ball joint 84 is connected by second tube 82 to ball joint 86 which is integral with male extension 88 which is received in housing 20.

Figure 20:
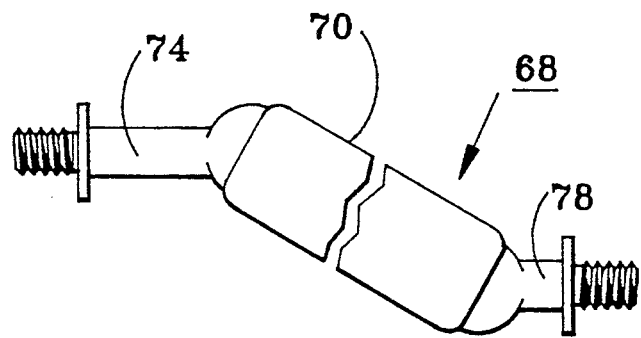
FIG. 20 is an external view a first double-ball-joint tubular connector useful in the invention with two male extensions.
Figure 21:
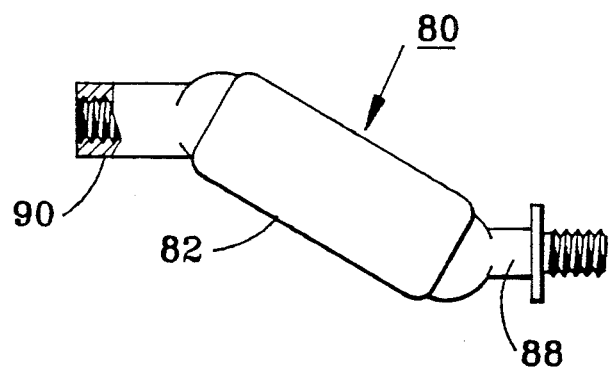
FIG. 21 is a external view of a second double-ball-joint tubular connector useful in the invention with one female extension and one male extension.

Referring to FIGS. 20 and 21, typical external views are shown of the first double-ball-joint tubular connector 58 and the second double-ball-joint tubular connector 80.

FIG. 20 shows first tubular connector 68, with male extension 74 and male extension 78 at opposite extremities of first tube 70. FIG. 21 shows second tubular connector 80, with female extension 9 and male extension 88 at opposite extremities of second tube 82.

For assembly attachment combinations which are relatively long, it may be desirable to attach an anti-impact member (not shown) proximate to the assembly 36 to prevent damage caused by accidental impact of the assembly 36 with the vehicle roof 48. Such an anti-impact member can be an elongated rubber or soft plastic structure about 3 inches in length and about $\frac{1}{2}" \times \frac{1}{2}"$ in cross section. Such an anti-impact member can be attached proximate to the assembly 36 by inserting the male extension 88 through a hole of similar diameter defined in one end of the anti-impact member.

The geometries shown in FIGS. 17 through 21 are merely typical possibilities, showing offsets achievable with the use of tubular connectors 68 and 80 used one at a time or in combination. Important dimensions, such as leg length and torso height, of drivers are variable, as are the width, window configuration and front seat geometry of automotive vehicles. Therefore, the eyes-to-front windshield distance is also variable. With the additional degrees of freedom shown in FIGS. 18 and 19 the length and inclination of the eyes-to-rear view mirror distance can be adjusted for the eyes to be close to the bisector of the central angle of the mirror arc for optimum rearward vision for the particular driver. It is possible to bring the rear view mirror closer to the driver's eyes and/or move the rear view mirror lateral and/or up and down.

It should also be noted that all ball joints (designated by 30, 72, 76, 84 and 86 in FIGS. 17, 18 and 19) and all hinge connections (between insertion brackets 28 and insertion slots 34 shown on FIGS. 3, 10, 11, 12, 13, 14 and 15) are friction joints, which means that any configurations of mirror mounting and connected sun visor flaps 24 in rear view mirror and sun visor assembly 36, sun visor assembly 38, or sun shield assembly 40 will stay put once adjusted by the driver. Also, the driver may readily overcome the friction in these joints and re-arrange any configuration of mirror mounting or assembly 36 or assembly 38 while driving.

The unique nature of convex review mirror 22 includes circular curvature, a long radius of curvature (of at least 8 feet, preferably about 10 feet), and long horizontal dimension (of at least one foot, preferably between about one and two feet). The spherical curvature extends the rear field of view in the downward direction, and the combination of long radius of curvature and long horizontal dimension provide the wide rearward viewing field designated by the angle 58-54-58 in FIG. 16 with minimum distortion.

The arrangement shown in FIG. 1 makes it possible for the driver to adjust mirror 22 and sun visor flap 24 independently while the front seat passenger can also independently adjust the passenger side sun visor flap 24 with vanity mirror 22'.

All the components of the present invention are preferably constructed of lightweight plastic, though the convex mirror may be made of glass, and the swivel attachment and tubular connectors of metal. Also, materials other than plastic may be used for the sun visor flaps. The degrees of freedom in the mounting of the rear view mirror and sun visor assembly to the vehicle, and the friction hinge construction for connecting a sun visor flap to the mirror housing and to another flap may be realize in other equivalent ways than those here described.

Thus, although the present invention has been described in considerable detail in its preferred embodiments, other realizations of specific components are possible without departing form the spirit and scope of the invention as delineated in the appended claims.

We claim:

1. A combination rear view mirror and sun visor assembly useful in an automotive vehicle having a vehicle interior and exterior and having a roof, front windshield, dashboard, driver's seat, and front passenger's seat, comprising:
   a mounting base for securing the assembly to the vehicle interior;
   a rear view mirror attachment means having a first end and a second end and being attached to the mounting base at its first end;
   an elongated rear view mirror housing having a top side and a bottom side attached to the second end of the rear view mirror attachment means;
   an elongated convex rear view mirror with circular curvature and a long radius of curvature encased in the rear view mirror housing;
   an adjustable hinge connection means connected to the bottom side of the housing; and
   a first sun visor flap with an elongated edge of similar dimension to that of the mirror housing connected to the hinge connection means, whereby the flap can be rotated about the edge to a plurality of positions with a 90° arc extending from an essentially horizontal position with the adjustable hinge connection means functioning to keep said stationary in each of the plurality of positions;
   wherein the rear view mirror attachment means comprises:
   a first ball joint attached to the housing;
   a second ball joint attached to the mounting base;
   a first tube having a first end and a second end with its first end being rotatably attached to the first ball joint;
   a second tube having a first end and a second end with its first end being rotatably attached to the second ball joint;
   a third ball joint rotatably attached to the second end of the first tube;
   a fourth ball joint rotatably attached to the second end of the second tube; and
   means for attaching the third ball joint and the fourth ball joint in fixed linear relationship.

2. The combination of claim 1 in which the means for attaching the third ball joint is a male extension attached to the fourth ball joint and coupled to a corresponding female extension which is attached to the third ball joint.

* * * * *